(12) United States Patent
Song (10) Patent No.: US 10,454,081 B2
(45) Date of Patent: Oct. 22, 2019

(54) BATTERY PACK

(71) Applicant: LG Chem, Ltd., Seoul (KR)

(72) Inventor: Han Gab Song, Daejeon (KR)

(73) Assignee: LG Chem, Ltd. (KR)

( * ) Notice: Subject to any disclaimer, the term of this patent is extended or adjusted under 35 U.S.C. 154(b) by 141 days.

(21) Appl. No.: 15/563,236

(22) PCT Filed: Sep. 12, 2016

(86) PCT No.: PCT/KR2016/010271
§ 371 (c)(1),
(2) Date: Sep. 29, 2017

(87) PCT Pub. No.: WO2017/048020
PCT Pub. Date: Mar. 23, 2017

(65) Prior Publication Data
US 2018/0090728 A1    Mar. 29, 2018

(30) Foreign Application Priority Data

Sep. 18, 2015 (KR) .................. 10-2015-0132621
Sep. 9, 2016 (KR) .................. 10-2016-0116357

(51) Int. Cl.
*H01M 2/10* (2006.01)
*H01M 10/613* (2014.01)
*H01M 10/48* (2006.01)
*H01M 10/659* (2014.01)

(52) U.S. Cl.
CPC ....... *H01M 2/1016* (2013.01); *H01M 10/482* (2013.01); *H01M 10/613* (2015.04); *H01M 10/659* (2015.04)

(58) Field of Classification Search
None
See application file for complete search history.

(56) References Cited

U.S. PATENT DOCUMENTS

| | | |
|---|---|---|
| 2003/0188676 A1 | 10/2003 | Petrakis |
| 2006/0063066 A1 | 3/2006 | Choi et al. |
| 2011/0039147 A1 | 2/2011 | Cheon et al. |
| 2011/0189522 A1 | 8/2011 | Kim |
| 2012/0135281 A1 | 5/2012 | Choi et al. |
| 2014/0106198 A1 | 4/2014 | Guha et al. |

(Continued)

FOREIGN PATENT DOCUMENTS

| | | |
|---|---|---|
| CN | 102593509 A | 7/2012 |
| CN | 102664292 A | 9/2012 |

(Continued)

OTHER PUBLICATIONS

Extended European Search Report including Written Opinion for Application No. EP16846841.1 dated Jul. 18, 2018.

(Continued)

*Primary Examiner* — Sarah A. Slifka
(74) *Attorney, Agent, or Firm* — Lerner, David, Littenberg, Krumholz & Mentlik, LLP (57) ABSTRACT

A battery pack according to the present invention comprises a battery cell and a battery case accommodating the battery cell, wherein the battery case comprises an inner case accommodating the battery cell, an outer case disposed outside the inner case, and a cooling member between the inner and outer cases to indirectly cool the battery cell by using cool air generated by cooling the inner and outer cases.

10 Claims, 7 Drawing Sheets

(56) References Cited

U.S. PATENT DOCUMENTS

| | | |
|---|---|---|
| 2014/0335382 A1 | 11/2014 | Balandin |
| 2016/0087319 A1 | 3/2016 | Roh et al. |

FOREIGN PATENT DOCUMENTS

| | | |
|---|---|---|
| CN | 103325964 A | 9/2013 |
| CN | 103633263 A | 3/2014 |
| CN | 104538692 A | 4/2015 |
| CN | 104900826 A | 9/2015 |
| DE | 102013021597 A1 | 7/2014 |
| JP | S4947086 A | 5/1974 |
| JP | S6362168 A | 3/1988 |
| KR | 20060048991 A | 5/2006 |
| KR | 20070025418 A | 3/2007 |
| KR | 100946580 B1 | 3/2010 |
| KR | 101072955 B1 | 10/2011 |
| KR | 101097226 B1 | 12/2011 |
| KR | 20140129449 A | 11/2014 |
| KR | 20140143854 A | 12/2014 |
| WO | 9515014 A1 | 6/1995 |

OTHER PUBLICATIONS

Search report from International Application No. PCT/KR2016/010271, dated Dec. 20, 2016.
Partial Supplementary European Search Report including Written Opinion for Application No. EP16846841.1 dated Mar. 27, 2018.

BATTERY PACK

CROSS-REFERENCE TO RELATED APPLICATIONS

The present application is a national phase entry under 35 U.S.C. § 371 of International Application No. PCT/KR2016/010271, filed Sep. 12, 2016, published in Korean, which claims priority from Korean Patent Application Nos. 10-2015-0132621, filed on Sep. 18, 2015, and 10-2016-0116357, filed on Sep. 9, 2016, the disclosures of which are incorporated herein by reference in their entirety.

TECHNICAL FIELD

The present invention relates to a battery pack, and more particularly, to a battery pack comprising a battery case having excellent cooling performance.

BACKGROUND ART

In general, rechargeable batteries may be chargeable and dischargeable batteries, unlike primary batteries that are impossible to charge.

Such rechargeable batteries comprise low-capacity battery packs that are used for portable small electronic devices and high-capacity battery packs that are used for power sources for driving motors of hybrid vehicles.

DISCLOSURE OF THE INVENTION

Technical Problem

A battery pack comprises a battery module provided with a plurality of battery cells and a battery case in which the battery module is built.

However, the battery pack according to the related art has a problem that the battery pack is significantly deteriorated in performance when the battery module increases to a temperature greater than a preset temperature.

The present invention has been made to solve the abovementioned problem, and an object of the prevent invention is to provide a battery case having excellent cooling performance, thereby preventing the battery module from increasing in temperature and improving performance of the battery module.

Technical Solution

To achieve the abovementioned object, a battery pack according to the present invention comprises: a battery cell; and a battery case accommodating the battery cell, wherein the battery case comprises an inner case accommodating the battery cell, an outer case disposed outside the inner case, and a cooling member between the inner and outer cases to indirectly cool the battery cell by using cool air generated by cooling the inner and outer cases.

The cooling member may have a thickness less than that of each of the inner case and the outer case.

The cooling member may have a thickness of 1 nm to 1 mm.

The cooling member may be provided as a phase change material (PCM).

The PCM may comprise any one selected from the group consisting of an inorganic material in the form of hydrate, paraffinic hydrocarbon, and organic acids or a mixture of two or more thereof.

The outer case may be disposed to surround an outer circumferential surface of the inner case, and the cooling member may be provided as a cooling liquid stored in a sealed space between the inner case and the outer case.

The battery case may further comprise a cutoff member that cuts the inner case so that the cooling member is introduced into the inner case when the battery cell increases to a preset temperature or more, and the cooling member introduced into the inner case may come into contact with the battery cell to directly cool the battery cell.

The cutoff member may comprise a cutoff part provided in a surface of the inner case and an expansion material disposed between the inner case and the outer case to press and cut the cutoff part while being expanded by high-temperature heat transferred from the battery cell.

The cutoff part may be provided as a cutoff groove.

The expansion material may comprise a shape-memory alloy.

The expansion material may have both ends that respectively adhere to the inner case and the outer case.

At least one or more cutoff members may be disposed on an entire wall of the battery case in which the cooling member is stored.

Advantageous Effects

To achieve the abovementioned object, the battery pack according to the present invention may comprise: the battery cell; and the battery case accommodating the battery cell, wherein the battery case comprises the inner case accommodating the battery cell, the outer case disposed outside the inner case, and the cooling member between the inner and outer cases to indirectly cool the battery cell by using the cool air generated by cooling the inner and outer cases.

The cooling member may have a thickness less than that of each of the inner case and the outer case.

The cooling member may have a thickness of 1 nm to 1 mm.

The cooling member may be provided as the phase change material (PCM).

The PCM may comprise any one selected from the group consisting of an inorganic material in the form of hydrate, paraffinic hydrocarbon, and organic acids or a mixture of two or more thereof.

The outer case may be disposed to surround the outer circumferential surface of the inner case, and the cooling member may be provided as the cooling liquid stored in the sealed space between the inner case and the outer case.

The battery case may further comprise the cutoff member that cuts the inner case so that the cooling member is introduced into the inner case when the battery cell increases to a preset temperature or more, and the cooling member introduced into the inner case may come into contact with the battery cell to directly cool the battery cell.

The cutoff member may comprise the cutoff part provided in the surface of the inner case and the expansion material disposed between the inner case and the outer case to press and cut the cutoff part while being expanded by high-temperature heat transferred from the battery cell.

The cutoff part may be provided as the cutoff groove.

The expansion material may comprise the shape-memory alloy.

The expansion material may have both the ends that respectively adhere to the inner case and the outer case.

At least one or more cutoff members may be disposed on the entire wall of the battery case in which the cooling member is stored.

BRIEF DESCRIPTION OF THE DRAWINGS

FIGS. 5 and 6 are views illustrating a configuration in which a cutoff part is viewed from the inside of the battery case.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

First Embodiment of the Present Invention

Figure 1:
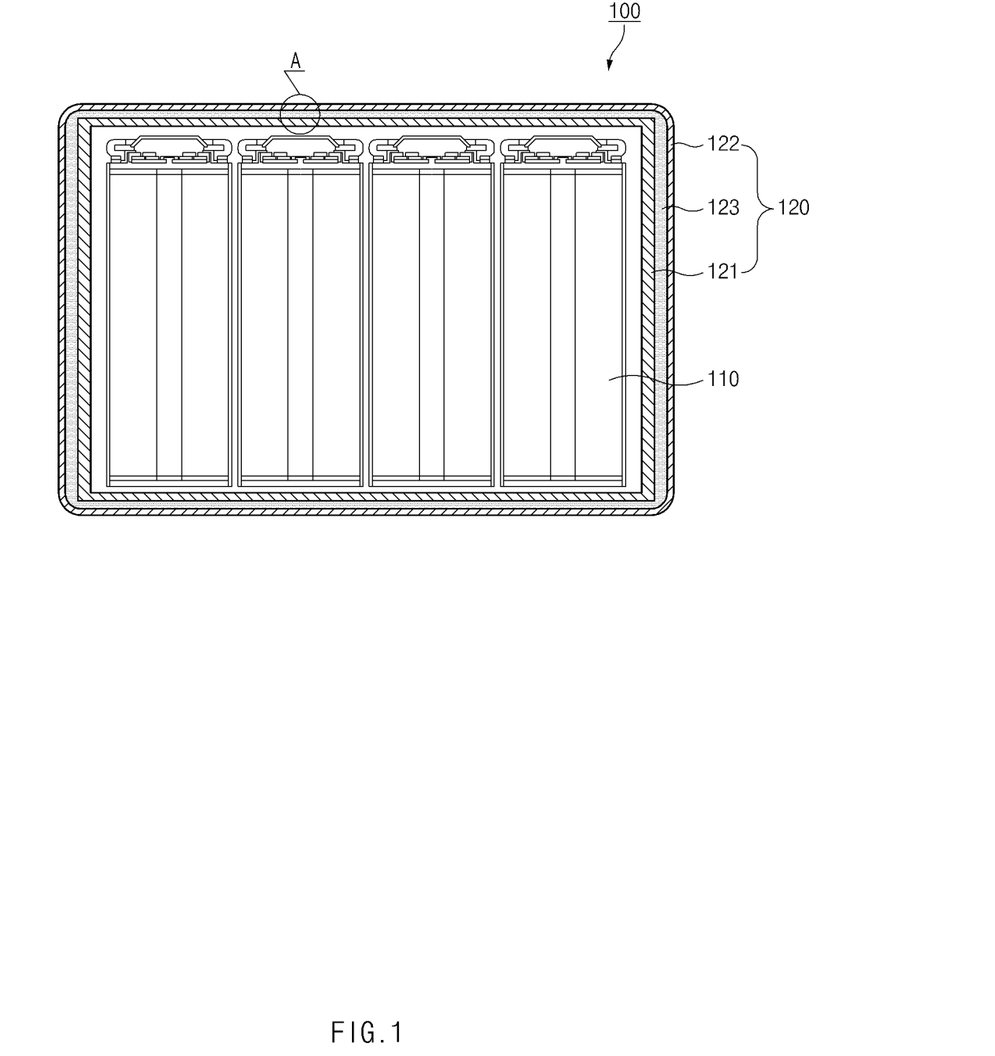
FIG. 1 is a view of a battery pack according to a first embodiment of the present invention.

A battery pack 100 according to a first embodiment of the present invention comprises one or more battery cells 110 and a battery case 120 in which the battery cells 110 are accommodated.

Each of the battery cells 110 comprises an electrode assembly in which a first electrode, a separator, and a second electrode are sequentially stacked and a case assembly in which an electrolyte is accommodated together with the electrode assembly. Also, a first electrode tab and a second electrode tab are disposed on the first electrode and the second electrode, respectively. A first electrode terminal is coupled to the first electrode tab, and a second electrode terminal is coupled to the second electrode tab. The first electrode is a positive electrode, and the second electrode is a negative electrode. Of course, the reverse case may be possible. Also, the case assembly comprises a can accommodating the electrode assembly and the electrolyte and a cap assembly mounted on an opening of the can.

Figure 2:
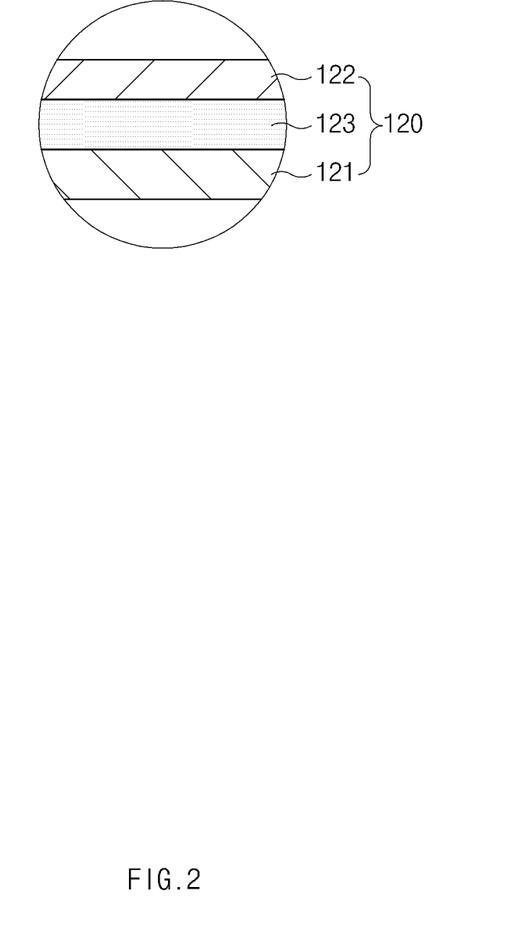
FIG. 2 is an enlarged view of a portion 'A' illustrated in FIG. 1.

The battery case 120 is configured to accommodate the one or more battery cells 110. The battery case 120 comprises an inner case 121 that accommodates the battery cells 110 and the electrolyte therein and defines an inner wall and an outer case 122 disposed outside the inner case 121 and defining an outer wall.

Here, the battery cell 110 generates heat when charged or discharged. The heat may be gradually accumulated in the sealed battery case 120 to sharply rise temperatures of the battery cell 110 and the electrolyte. Thus, the battery cell 110 may sharply increase in temperature to deteriorate performance of the battery cell 110.

To solve the above-described problem, the battery pack 100 according to the present invention comprises a cooling member 123 having excellent cooling performance between the inner case 121 and the outer case 122. The cooling member 123 cools the inner case 121 and the outer case 122. Here, the heat accumulated in the battery case 120 may be absorbed to cool air generated by cooling the inner case 121 through the cooling member 123, and thus, an inner temperature of the battery case 120 may decrease to prevent the battery cell 110 from increasing in temperature, thereby improving the performance of the battery cell 110.

That is, the battery pack according to the present invention may cool the inner and outer cases 121 and 122 through the cooling member 123 having the excellent cooling performance to indirectly cool the battery cell 110 by using the cool air. Thus, the battery cell 110 may be prevented from increasing in temperature to improve the performance.

The cooling member 123 has a thickness less than that of each of the inner case 121 and the outer case 122.

That is, when the cooling member 123 has a thickness greater than that of each of the inner and outer cases 121 and 122, the product property may be deteriorated due to the increases in thickness of the battery case 120. Particularly, when a liquid is used as the cooling member, the inner and outer cases 121 and the 122 may be deformed to a space. Thus, the cooling member 123 may have a thickness less than that of each of the inner and outer cases 121 and 122 to improve the product property and minimize the deformation of the inner or outer case 121 or 122.

The cooling member 123 may have a thickness of 1 nm to 1 mm. That is, when the thickness of the cooling member 123 is less than 1 nm, cooling efficiency may be deteriorated due to the too thin thickness. When the thickness of the cooling member 123 is greater than 1 mm, an angle at which the inner and outer cases 121 and 122 are bent to the cooling member 123 may increase to cause the deformation.

The cooling member 123 may be made of a phase change material (PCM). The PCM accumulates a large amount of heat energy or emits heat energy through a phase change process. That is, the PCM absorbs heat or emits absorbed heat through a physical change process that changes from one state to a different state such as from a solid to a liquid, from a liquid to a gas, or from a gas to a liquid.

Here, the PCM may comprise any one selected from the group consisting of an inorganic material in the form of hydrate, paraffinic hydrocarbon, and organic acids or a mixture of two or more thereof so as to absorb a large amount of heat emitted from the battery cell 110.

Thus, the battery pack 100 according to the first embodiment of the present invention may comprise the cooling member 123 made of the PCM to absorb a large amount of heat emitted from the battery cell 110. Thus, the battery cell 110 may be prevented from increasing in temperature to improve the performance of the battery cell 110.

Hereinafter, in description of a battery pack according to another embodiment of the present invention, components of another embodiment having the same construction as the first embodiment have been given the same reference numeral in the drawings, and thus duplicated description will be omitted.

Second Embodiment of the Present Invention

Figure 3:
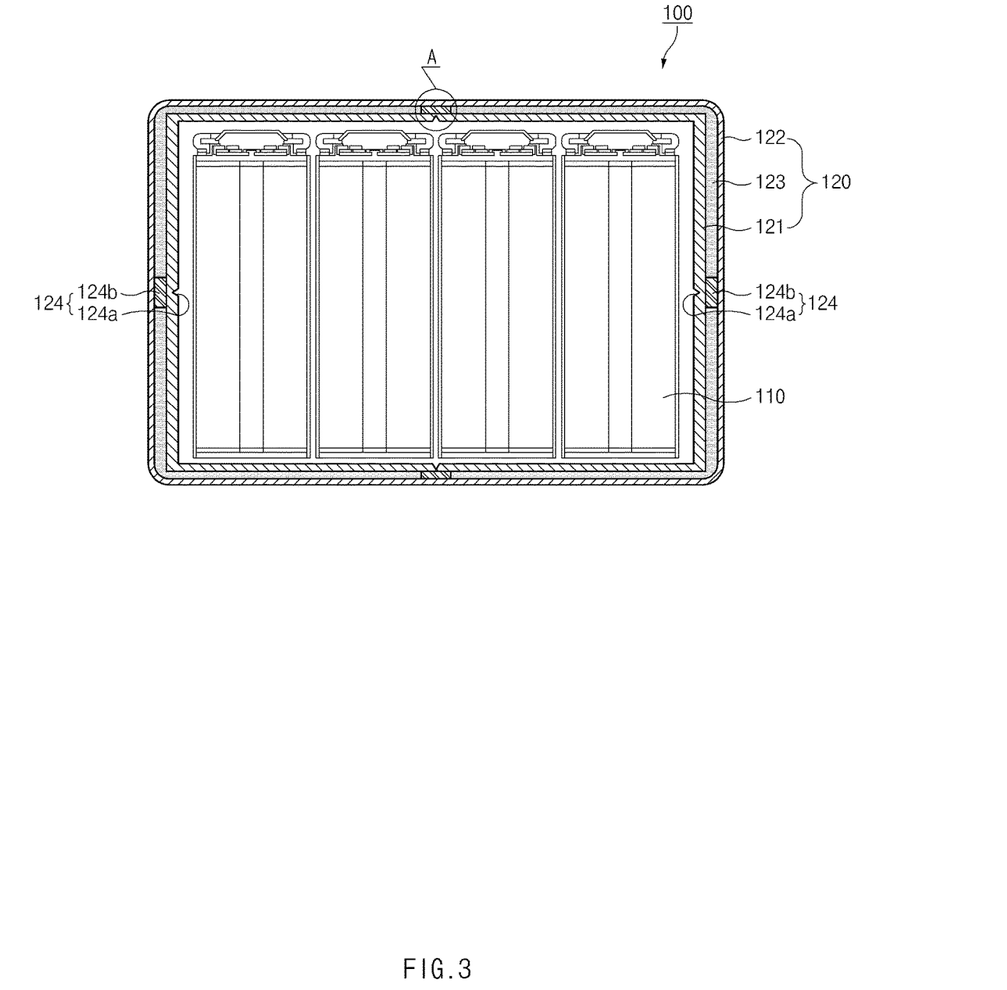
FIG. 3 is a view of a battery pack according to a second embodiment of the present invention.

As illustrated in FIG. 3, a battery pack 100 according to a second embodiment of the present invention comprises one or more battery cells 110 and a battery case 120 accommodating the battery cells 110. The battery case 120 comprises an inner case 121 accommodating the battery cells 110, an outer case 122 disposed outside the inner case 121, and a cooling member 123 disposed between the inner and outer cases 121 and 122 to indirectly cool the battery cells 110 by using cool air generated by cooling the inner and outer cases 121 and 122.

Figure 4:
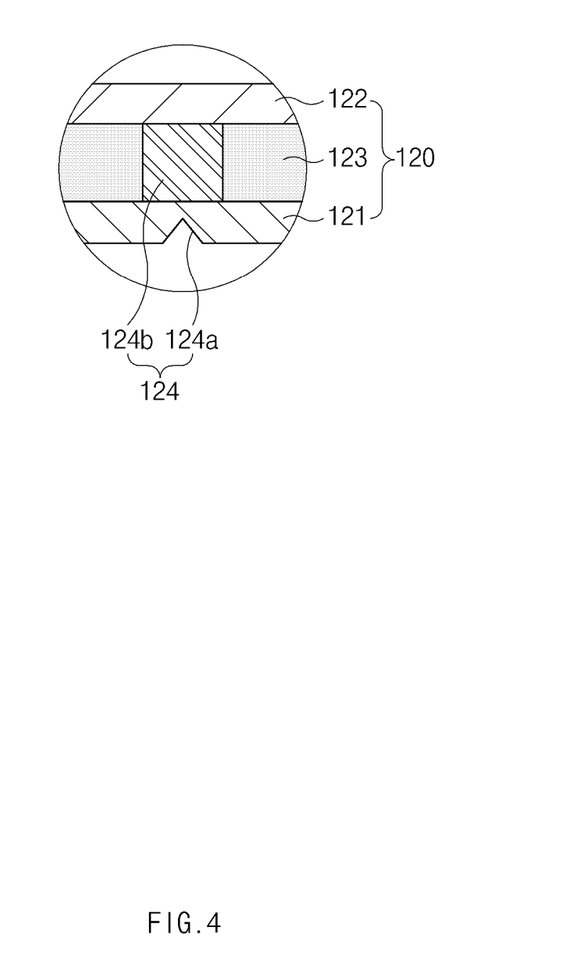
FIG. 4 is an enlarged view of a portion 'B' illustrated in FIG. 3.

Here, the outer case 122 is provided to surround an outer circumferential surface of the inner case 121. Thus, a sealed space may be defined between the inner case 121 and the outer case 122, and the cooling member 123 may be stored in the sealed space and thus be prevented from be exposed or leaking to the outside.

Also, the cooling member 123 is provided as a cooling liquid stored in the sealed space between the inner case 121 and the outer case 122. Thus, the cooling member 123 that is the cooling liquid may increase contact force of the inner case 121 with the outer case 122 and effectively cool the outer case 122 as well as the inner case 121.

When the battery pack 100 is excessively charged (overcharged) with respect to rated capacity, there is a limitation in lowering a temperature of the battery cell 110 only by the indirect cooling of the cooling member 123. Thus, the battery cell 110 may gradually increase in temperature to cause explosion or ignition.

To solve the above-described problem, in the battery pack 100 according to the second embodiment of the present invention, when the battery cell 110 increases to a temperature greater than a preset temperature, the cooling member 123 that is the cooling liquid is introduced into the inner case 121 to directly cool the battery cell 110 accommodated in the inner case 121. Thus, the battery cell 110 may be prevented from increasing in temperature and prevented from being exploded or ignited.

That is, the battery case 120 of the battery pack 100 according to the second embodiment of the present invention may further comprise a cutoff member 124 that cuts the inner case 121 to allow the cooling member 123 to be introduced into the inner case 121 when the battery cell 110 increases to a temperature greater than the present temperature. Thus, the cooling member 123 that is the cooling liquid introduced into the inner case 121 may come into contact with the battery cell 110 to directly cool the battery cell 110, thereby reducing the temperature of the battery cell 110.

Here, the cutoff member 124 comprises a cutoff part 124*a* provided in a surface of the inner case 121 and an expansion material 124*b* disposed between the inner case 121, in which the cutoff part 124*a* is provided, and the outer case 122 to press the cutoff part 124*a* toward the inside of the inner case 121 while being expanded by high-temperature heat transferred from the battery cell 110.

Figure 5:
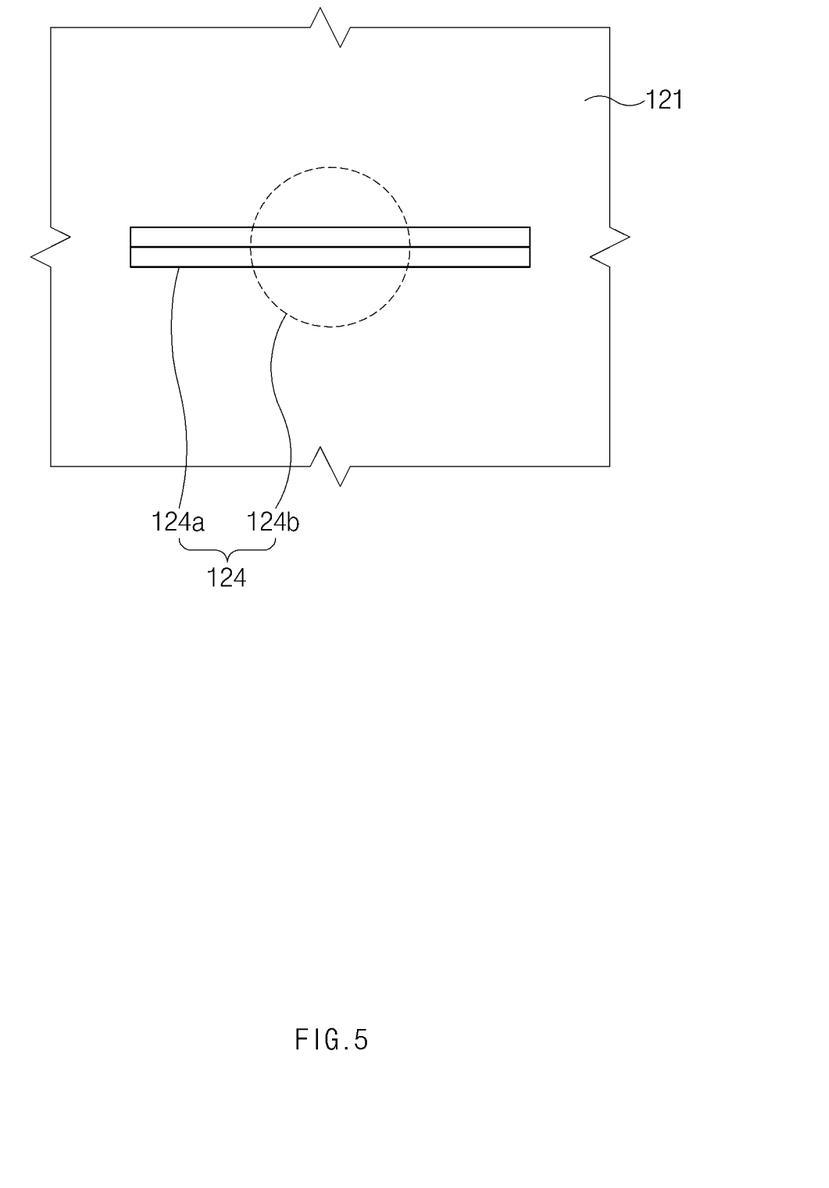
FIG. 5 is a partial cutaway view of a cutoff part having a band shape.
Figure 6:
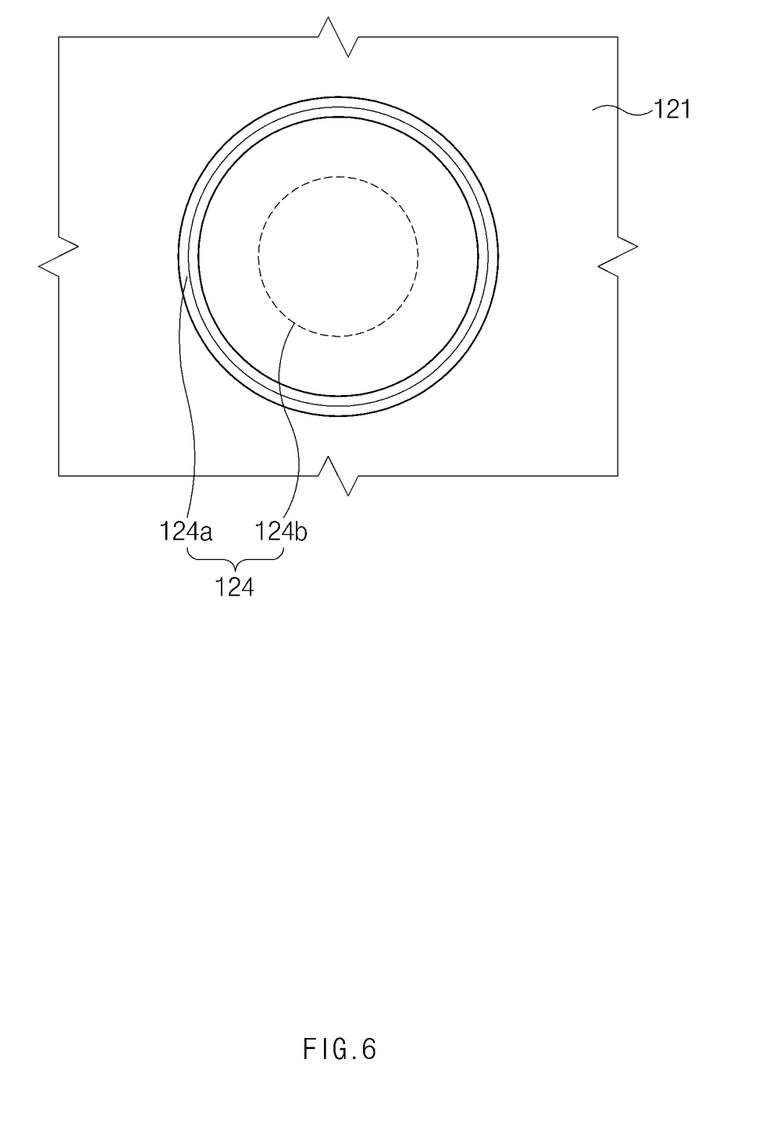
FIG. 6 is a partial cutaway view of a cutoff part having a ring shape.

The cutoff part 124*a* is provided as a cutoff groove in the surface of the inner case 121. That is, as illustrated in FIG. 5, the cutoff part 124*a* has a band shape of which both ends are directed in directions opposite to each other, and the expansion material 124*b* directly presses the cutoff part 124*a* to cut the cutoff part 124*a*. Also, as illustrated in FIG. 6, the cutoff part 124*a* has a ring shape of which both ends are connected to each other, and the expansion material 124*b* presses a center of the cutoff part 124*a* having the ring shape to cut the cutoff part 124*a*. Here, a cutoff hole may be defined in the inner case 121 to more effectively introduce the cooling member 123.

Also, the expansion material 124*b* has an inner end supported by the inner case 121 provided with the cutoff part 124*a* and an outer end supported by the outer case 122 at a position corresponding to the cutoff part 124*a*. Particularly, the inner end and the outer end of the expansion material 124*b* adhere to the inner case 121 and the outer case, respectively. Thus, the expansion material 124*b* may be stably fixed between the inner case 121 and the outer case 122.

The preset temperature may range of 80° C. to 100° C.

The expansion material 124*b* may be provided as a shape-memory alloy. That is, the shape-memory alloy refers to a metal that is restored to its original shape when a temperature decreases even if the metal is deformed by a high temperature because of remembering its original shape. The shape-memory alloy comprises a nickel-titanium alloy, a copper-zinc alloy, a gold-cadmium alloy, an indium-thallium alloy, and the like.

Thus, the expansion material 124*b* that is the shape-memory alloy may press and cut the cutoff part 124 while being deformed in shape by a change in temperature of the battery cell 110. The expansion material 124*b* that is the shape-memory alloy may return again to its original shape if the battery cell 110 does not increase to the preset temperature or more.

Since the expansion material 124*b* is provided as the shape-memory alloy, the battery cell 110 may quickly respond to a change in temperature and thus improve stability of the battery pack 100.

At least one or more cutoff members 124 may be disposed on the entire wall of the battery case 120 in which the cooling member 123 is stored. That is, the cutoff member 124 may be disposed between the inner and outer cases 121 and 122 that are disposed at the front/rear, left/right, and upper/lower sides of the battery case 120 in which the cooling member 123 is stored. Thus, the cooling member 123 may be introduced in a front/rear, left/right, and upward/downward directions of the inner case 121.

Hereinafter, a use state of the battery pack 100, which comprises the above-described constituents, according to the second embodiment of the present invention will be described.

Figure 7:
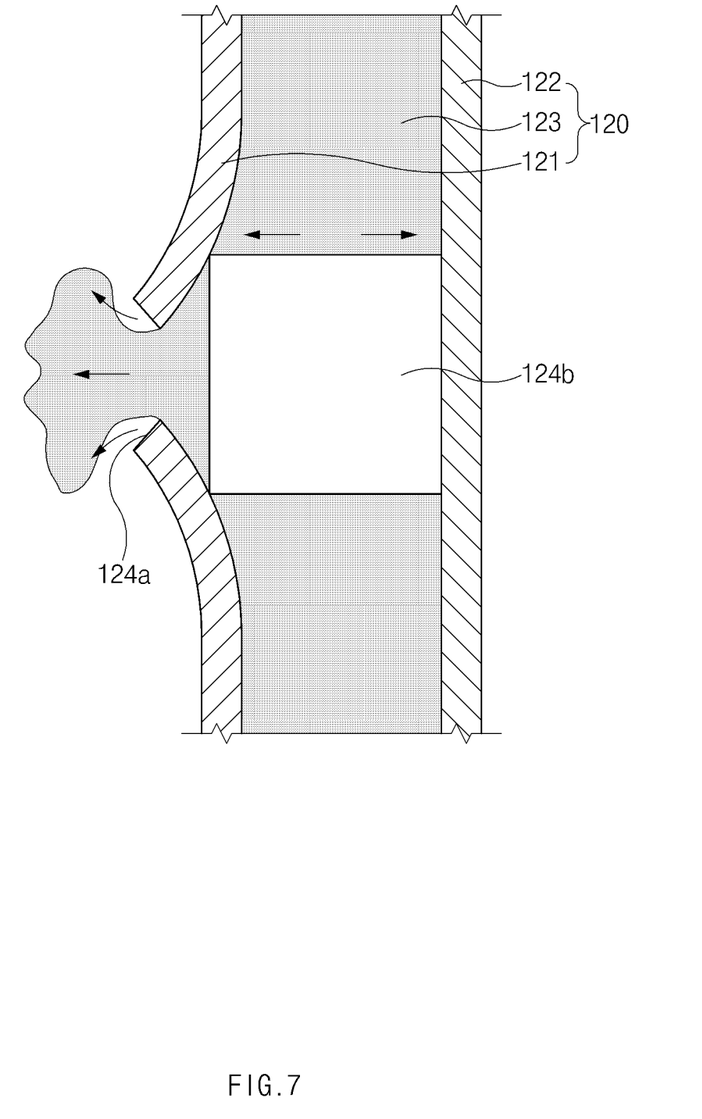
FIG. 7 is a view illustrating an operation state of the battery pack according to the second embodiment of the present invention.

As illustrated in FIG. 7, when the battery pack 100 is charged and discharged, the battery cell 110 accommodated in the battery case 120 increases in temperature. Here, the battery cell 110 may be indirectly cooled by the cooling member 123 of the battery case 120 to prevent the battery cell from increasing in temperature, thereby preventing the battery cell 110 from being deteriorated in performance.

When the battery pack 100 is overcharged, the battery cell 110 accommodated in the battery case 120 increases to a preset temperature or more. Here, the expansion material 124*b* of the cutoff member 124 is expanded by a heat source transferred from the battery cell 110 to press and cut the cutoff part 124*a* provided in the inner case 121. As a result, the cooling member 123 is introduced through a cut portion of the inner case 121 to directly cool the battery cell 110, thereby preventing the battery cell 110 from increasing in temperature.

Thus, in the battery pack 100 according to the second embodiment of the present invention, when the battery cell 110 increases to the preset temperature or more, the battery cell 110 may be directly cooled through the cooling member 123 stored in the battery case 120 to effectively cool the battery cell 110 and also prevent the battery pack 100 from being exploded or ignited.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A battery pack comprising:
   a battery cell; and
   a battery case accommodating the battery cell therein,
   wherein the battery case comprises an inner case accommodating the battery cell therein, an outer case surrounding an outer circumferential surface of the inner case, a cooling member disposed in a sealed space between the inner and outer cases and being a cooling liquid configured to indirectly cool the battery cell by using cool air generated by cooling the inner and outer cases, and a cutoff member configured to cut the inner case when a temperature of the battery cell reaches or exceeds a preset limit temperature so that the cooling member enters the inner case and contacts the battery cell to directly cool the battery cell.

2. The battery pack of claim 1, wherein the cooling member has a thickness less than that of each of the inner case and the outer case.

3. The battery pack of claim 2, wherein the cooling member has a thickness of 1 nm to 1 mm.

4. The battery pack of claim 1, wherein the cooling member is provided as a phase change material (PCM).

5. The battery pack of claim 4, wherein the PCM comprises any one selected from the group consisting of an inorganic material in the form of hydrate, paraffinic hydrocarbon, and organic acids or a mixture of two or more thereof.

6. The battery pack of claim 1, wherein the cutoff member comprises a cutoff part provided in a surface of the inner case and an expansion material disposed between the inner case and the outer case, the expansion material being configured to press and cut the cutoff part while being expanded by high-temperature heat transferred from the battery cell.

7. The battery pack of claim 6, wherein the cutoff part is provided as a cutoff groove.

8. The battery pack of claim 6, wherein the expansion material comprises a shape-memory alloy.

9. The battery pack of claim 6, wherein the expansion material has first and second opposite ends that respectively adhere to the inner case and the outer case.

10. The battery pack of claim 6, wherein the cutoff member comprises one or more cutoff members disposed at one or more respective locations along an entire wall of the battery case.

* * * * *